US007630414B2

United States Patent
Clauberg

(10) Patent No.: US 7,630,414 B2
(45) Date of Patent: Dec. 8, 2009

(54) MULTIPLE LOW-SPEED INTO SINGLE HIGH-SPEED SDH/SONET CHANNEL MAPPER/FRAMER DEVICE AND METHOD

(75) Inventor: Rolf Clauberg, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/475,367

(22) PCT Filed: Mar. 22, 2002

(86) PCT No.: PCT/EP02/03273

§ 371 (c)(1),
(2), (4) Date: Oct. 21, 2003

(87) PCT Pub. No.: WO02/089374

PCT Pub. Date: Nov. 7, 2002

(65) Prior Publication Data
US 2004/0131090 A1 Jul. 8, 2004

(30) Foreign Application Priority Data
Apr. 26, 2001 (EP) ................................. 01110294

(51) Int. Cl.
*H04J 3/02* (2006.01)
(52) U.S. Cl. .................. 370/540; 370/352; 370/464; 370/498; 370/503; 370/535
(58) Field of Classification Search ................ 370/352, 370/464, 498, 503, 535, 901, 902, 903, 907
See application file for complete search history.

(56) References Cited

U.S. PATENT DOCUMENTS

| | | | | |
|---|---|---|---|---|
| 4,196,315 A | * | 4/1980 | Boutmy et al. | 370/506 |
| 4,949,339 A | * | 8/1990 | Shimada et al. | 370/538 |
| 5,790,557 A | | 8/1998 | Lee et al. | |
| 5,878,039 A | * | 3/1999 | Gorshe et al. | 370/376 |
| 5,940,456 A | * | 8/1999 | Chen et al. | 375/356 |
| 6,058,119 A | * | 5/2000 | Engbersen et al. | 370/466 |
| 6,298,038 B1 | * | 10/2001 | Martin et al. | 370/216 |
| 6,359,859 B1 | * | 3/2002 | Brolin et al. | 370/218 |
| 6,577,623 B1 | | 6/2003 | Kawai | |
| 6,891,863 B1 | * | 5/2005 | Penkler et al. | 370/539 |
| 7,002,986 B1 | * | 2/2006 | Roberts | 370/465 |
| 7,353,288 B1 | * | 4/2008 | Rangavajjhala et al. | 709/236 |

FOREIGN PATENT DOCUMENTS

| | | |
|---|---|---|
| EP | 0874487 A | 10/1998 |
| EP | 1067722 A | 1/2001 |
| JP | 08-125626 | 5/1996 |
| JP | 11-136246 | 9/1998 |
| JP | 11-112537 | 4/1999 |

(Continued)

*Primary Examiner*—Ricky Ngo
*Assistant Examiner*—Luat Phung
(74) *Attorney, Agent, or Firm*—Derek S. Jennings; Anne Vachon Dougherty

(57) ABSTRACT

A method and a device for combining at least two data signals having a first data rate into a single data stream having a second data rate higher than the first data rate for transmission on a shared medium or vice versa. The device has at least one port for receiving at least two data signals and a port addressing unit for extracting data from the data signals received by the ports. The port addressing unit is configured to place the extracted data at predetermined positions in the single data stream to be transmitted on the shared medium and at least one control data insertion unit is provided for placing control data in the single data stream.

11 Claims, 2 Drawing Sheets

FOREIGN PATENT DOCUMENTS

| | | |
|---|---|---|
| JP | 11-205364 | 7/1999 |
| JP | 2001-044961 | 2/2001 |
| JP | 2001-053710 | 2/2001 |
| WO | WO96/31962 | 10/1996 |
| WO | WO96/33563 | 10/1996 |
| WO | WO 0077960 | 12/2000 |

* cited by examiner

| A1 | A1 | A1 | A2 | A2 | A2 | J0 | X* | X* |
|----|----|----|----|----|----|----|----|----|
| B1 |    |    | E1 |    |    | F1 | X  | X  |
| D1 |    |    | D2 |    |    | D3 |    |    |
| H1 | Y  | Y  | H2 | '1'| '1'| H3 | H3 | H3 |
| B2 | B2 | B2 | K1 |    |    | K2 |    |    |
| D4 |    |    | D5 |    |    | D6 |    |    |
| D7 |    |    | D8 |    |    | D9 |    |    |
| D10|    |    | D11|    |    | D12|    |    |
| S1 | Z1 | Z1 | Z2 | Z2 | M1 | E2 | X  | X  |

MULTIPLE LOW-SPEED INTO SINGLE HIGH-SPEED SDH/SONET CHANNEL MAPPER/FRAMER DEVICE AND METHOD

BACKGROUND OF THE INVENTION

1. Field of the Invention

The present invention relates to a method and device for combining at least two data signals having a first data rate into a single data stream having a second data rate being higher than the first data rate for transmission on a shared medium and vice versa. Particularly, the present invention relates to a method and device for combining 84 T-1 (DS-1) channels of 1.544 Mb/s (megabits per second) each into one STM-1 frame corresponding to 155 Mb/s and 63 E-1 channels of 2.048 Mb/s each or 21 T-2 (DS-2) channels of 6.312 Mb/s each into one STM-1 frame, respectively. However, the concept of the present invention is also applicable for different protocols or other hierarchical levels of the SDH or SONET standard as apparent from the following description.

2. Description of the Related Art

The American National Standards Institute has established a standard for high-speed, multiplexed digital data transmission. This is the "synchronous optical network" standard, henceforth referred to as SONET. The SONET standard specifies optical interfaces, data rates, operation procedures and frame structures for multiplexed digital transmission via fiber optic networks.

The International Telecommunications Union (ITU) has adopted the Interface principles of SONET and recommended a new global transmission standard for high-speed digital data transmission. This standard is the "synchronous digital hierarchy" (SDH).

For an account of the SDH standard, reference should be made to the report 30 entitled "REPORT OF Q.22/15 MEETING" from "STUDY GROUP 15" of the ITU International Telecommunication Standardization Sector, bearing the document number "Temporary Document 62(3/15)" and the date "Geneva, 16-27 May 1994."

The SDH standard is designed to enable manufacturers to develop telecommunications equipment which:
a) will be interchangeable in all telecommunication networks built around the world to its standard; and which
b) is backwards compatible, i.e. can be used with data which is in the older telecommunications formats used in North America, Europe and Japan.

This is achieved by a complex hierarchy of so-called "Containers" (C) and "Virtual Containers" (VC), see FIG. 1. The container, e.g. C-4, C-3, C-12, etc., are information structures designed to accommodate data traffic with specific transmission rates. The C-4 carries traffic with a base rate of up to 139264 kbit/s, the C-3 container carries either up to 44736 or 34368 kbit/s, etc. The containers are turned into virtual containers by adding Path Overhead information (POH) to it. By procedures defined as multiplexing, mapping, or aligning, data structures are generated which are constitutive to the SDH. These data structures are named "Administrative Unit Groups" (AUG) and "Synchronous Transport Module" (STM). The label of an STM is defined by the number of AUGs it carries: a STM-4 contains for example four AUGs. An AUG contains either one "Administration Unit" (AU) of type AU-4 or three of type AU-3. Referring to the simplest cases, in turn one AU-4 contains one C-4 signal and one AU-3 carries one C-3 signal.

The SDH/SONET data frames, i.e., the STM-N signals, are 125 microseconds long. The amount of data transmitted in each frame depends on the hierarchy level N of the signal. The higher hierarchical levels are transmitted at higher data rates than the basic STM-1 level of approximately 155 Mbit/s. The exact transmission rate is defined as 155.52 Mbit/s. However, here and in the following transmission rates are often denoted by their approximate values. This is, in particular, due to the fact that the exact data transmission rates are distorted by overhead data traffic and idle cell stuffing. The integer N indicates how many times faster the data is transmitted than in the STM-1 level. For example STM-4 denotes a data transmission rate of 622 Mbit/s, whereby each data frame contains four times as many bytes as does a frame of STM-1. The highest defined level is STM-64, which has a data rate of 9.95 Gb/s. Hence, each part of the STM-N signal is broadcast in the same time as the corresponding part of an STM-1 signal, but contains N times as many bytes.

The STM-1 signal, as shown in FIG. 2, contains an information rectangle of 9 rows with 270 bytes/row corresponding to a SONET/SDH data rate of 155.52 Mbit/s. The first 9 bytes/row represent the "Section Overhead" henceforth SOH. The remaining 261 bytes/row are reserved for the VCs, which in FIG. 1 is a VC-4. The first column of a VC-4 container consists of the "Path Overhead" (POH). The rest is occupied by the payload (a C-4 signal). Several VCs can be concatenated to provide a single transmission channel with a corresponding bandwidth. For example, four VC-4 in a STM-4 signal can be concatenated to form a single data channel with approximately 600 Mbit/s capacity: in this case the four VCs are referred to in the standard terminology as VC-4-4c and the signal as STM-4c.

This flexibility of the SDH standard is partly due to the pointer concept: In SDH, the frames are synchronized, but the VCs within them are not locked to the frames. So the individual containers of the SDH signals do not have to be frame aligned or synchronized amongst each other. A "pointer" is provided in the Section Overhead which indicates the position of the above introduced POH, i.e., the start of a virtual container in the SDH frame. The POH can thus be flexibly positioned at any position in the frame. The multiplexing of information into higher order SDH frames becomes simpler than in the old data standards, and an expensive synchronization buffer is not required in SDH. Similarly, lower order signals can be extracted out of and inserted into the higher order SDH signals without the need to demultiplex the entire signal hierarchy. The pointers are stored in the fourth row of the Section Overhead.

The Section Overhead is further subdivided into: (i) The "Regenerator Section Overhead" or RSOH. This portion contains bytes of information which are used by repeater stations along the route traversed by the SONET/SDH Signal. The Regenerator Section Overhead occupies rows 1-3 of the Section Overhead. (ii) The "Multiplexer Section Overhead" or MSOH. This contains bytes of information used by the multiplexers along the SONET/SDH signal's route. The Multiplexer Section Overhead occupies rows 5-9 of the Section Overhead. These sections of the overhead are assembled and dissembled at different stages during the transmission process. FIG. 2 also shows an exploded view of the MSOH.

In the parallel SONET system, a base signal of 51.84 Mbit/s is used. It is called the Synchronous Transport Signal level 1, henceforth STS-1. This has an information rectangle of 9 rows with 90 bytes/row. The first three bytes/row are the section overhead and the remaining 87 bytes/row are the "synchronous payload envelope", henceforth SPE. Three of these SPEs fit exactly into one Virtual Container-4. Thus signals in the STS-1 signal format can be mapped into an STM-1 frame. Furthermore, frame aligned STS-1 or STM-1 signals can be multiplexed into higher order STM-N frames.

In general, any lower data rate signal which is combined with other such signals into new data frames of higher rate is referred to as a "tributary" signal. For example in the previous paragraph, the three STS-1 signals which are combined into one STM-1 signal are tributary signals. It may be noted that the scope of the term tributary in this description exceeds the standard definition, as it is also used to describe the inter-level signal mapping in SDH.

The present invention relates to a data processing module for mapping data, i.e. tributaries, into and out of the SDH/SONET formats. The data processing achieved with the present invention concerns in particular the compilation of data which is at relatively low data rates into standard data frames of relatively high data rate, and vice-versa.

U.S. Pat. No. 5,452,307 describes a general data multiplexing system comprising a plurality of data multiplexing buses through which a plurality of low-speed digital signals are collected into, and distributed from, a multiplexer/demultiplexer. In a data multiplexing mode, the low-speed digital signals entered from a plurality of low-speed transmission lines have their signal format converted by respectively corresponding low-speed interface circuits, and the resulting signals are multiplexed in time slots designated within a multiplexed signal of primary level on the up bus line of the corresponding data multiplexing bus, under the controls of respectively corresponding bus control circuits. The high-speed multiplexer collects the primary multiplexed signals on the up bus lines of the plurality of data multiplexing buses, and further multiplexes the collected signals up to a predetermined signal level. Thereafter, it sends the resulting secondary multiplexed signal to a high-speed interface module having a high-speed transmission line interface. The high-speed interface module converts the received secondary multiplexed signal so as to match the interface of a high-speed transmission line, and sends the resulting signal to the high-speed transmission line. In a data demultiplexing mode, the signal of the high-speed transmission line is processed by the high-speed interface module and the high-speed demultiplexer, and the resulting signals are distributed through the down bus lines of the data multiplexing buses so as to send the low-speed digital signals to the low-speed transmission lines.

In M. Stadler et. al., "An Embedded Stack Microprocessor for SDH Telecommunication Applications", in Proceedings of the IEEE 1998 Custom Integrated Circuits Conference (CICC'98), Santa Clara, Calif., USA, May 11-14, 1998, a microprocessor is disclosed which is integrated on the same die as the complete data path of a SDH Add-Drop Multiplexer (ADM). It handles over 1 Million interrupts per second from 29 asynchronous sources. The multiple asynchronous data sources are each connected either to multiple VC-3 mapping units (also called "mapper") or to multiple VC-12 mapping units for overhead processing. On one hand, each VC-3 mapping unit is coupled to a TU-3 framing unit (also called "framer") that also takes care of the pointer processing in order to facilitate the frequency adaption between the asynchronous data sources and the clock rate of the higher hierarchy levels. On the other hand, each VC-12 mapping unit is linked to a TU-12 framing unit that also takes care of the pointer processing in order to facilitate the frequency adaption between the asynchronous data sources and the clock rate of the higher hierarchy levels. Subsequently, all TU-3 and TU-12 framing units are combined into one data stream by a VC-4 mapping unit that itself is linked to a AU-4 framing unit for pointer processing and, thereafter, the data steam reaches a STM-1 framing unit, between each framing or mapping unit a different frequency area being realized.

With the increasing mix of voice and data on SDH/SONET networks there is a huge need for mapping low-speed plesiochronous digital hierarchy (PDH), i.e., a transmission system for voice communication using plesiochronous synchronization, channels into high-speed synchronous digital hierarchy (SDH) frames. This is presently done in a system such as the described above in M. Stadler et. al.

European patent application EP 0 874 487 A2 discloses a method, in which at least two data signals having a first data rate are multiplexed into a single data stream having a second data rate being higher than the first data rate for transmission on a shared medium or vice versa. Supercarrier control signals are generated. A supercarrier transmitter maps the supercarrier data signals and the supercarrier control signals into an output supercarrier signal of a high bit rate, and transmits same over high rate span. However, European patent application EP 0 874 487 A2 does not disclose a detailed solution for offering complete SDH/SONET processing for M low-speed channels in a single line of processing units operating at M times the speed of the low channels without the need of any further buffer in the data path behind the ports. Therefore it is difficult to implement the whole device using one single integrated circuit. Thus, it is a problem to construct the device with all its memories on one and the same chip.

Starting from this, it is an object of the present invention to provide a method and device to more efficiently perform the function of combining at least two data signals having a first data rate into a single data stream having a second data rate being higher than the first data rate for transmission on a shared medium and vice versa.

BRIEF SUMMARY OF THE INVENTION

The foregoing object is achieved by a method and a system as laid out in the independent claims. Further advantageous embodiments of the present invention are described in the sub claims and are taught in the following description.

According to the present invention a method and a device is provided for combining at least two data signals having a first data rate into a single data stream having a second data rate being higher than the first data rate for transmission on a shared medium or vice versa, said device comprises at least one port for receiving said at least two data signals and a port addressing unit for extracting data from the data signals received by said ports, wherein said port addressing unit is configured to place the extracted data at predetermined positions in said single data stream to be transmitted on said shared medium and at least one control data insertion unit is provided for placing control data in said single data stream.

Thus, a method and device proposed implementing a multiplexing structure in which the data from M parallel low-speed channels are multiplexed onto a data bus operating with M times the data rate of the M low-speed channels. A multiple-stage process where, e.g., 28 T-1 (DS-1) channels are re-mapped into one T-3 (DS-3) channel and 3 T-3 (DS-3) channels are then mapped into an STM-1 frame is advantageously avoided. However, it extents beyond simple multiplexing, since according to the present invention the data to be transmitted are fully processed in accordance with the applied protocol, e.g., SDH/SONET, in one go. Hence, the present invention teaches full SDH/SONET processing of the data and not only data multiplexing.

In order to facilitate full processing as aforementioned the data are augmented by additional control data which represent an encoding of the port number on which the corresponding data arrive (multiplex direction) or to which the data must be sent (demultiplex direction). Furthermore, control data such as path overhead information and section overhead information, including regenerator section overhead and multiplexer section overhead, are placed in the data stream. In case the control data are dependent on the data to be transmitted, also called "workload", the control data insertion unit may be configured to at least partly derive said control data from said data positioned in said data stream.

In a preferred embodiment of the present invention the control data insertion unit is configured to place the extracted data into said single data stream according to a predetermined transmission protocol, such as SONET or SDH. Alternatively or in addition, the port addressing unit may be configured to place the extracted data into said single data stream according to a predetermined transmission protocol, such as SONET or SDH.

By applying the concept of the present invention to, e.g., a multiple low-speed into single high-speed SDH/SONET channel mapper/framer device and method, it is possible to offer complete SDH/SONET processing for M low-speed channels in a single line of processing units operating at M times the speed of the low-speed channels is possible. Advantageously, employing in parallel M such processing lines each at the speed of the low-speed channels can be omitted. The system clock rate has to be sufficient, e.g., for STM-1 speed (or even up to STM-64 speed). Although there is a high number of low-speed channels, e.g., 84, the clock rate is sufficient serving all low-speed channels.

In other words, the present invention provides a method and device which advantageously implements a single data path at STM-1 speed instead of implementing, e.g., 84 parallel data paths at 1.544 Mb/s speed. This reduces manufacturing costs. Furthermore, all portions of the device are accordingly driven by the same system clock.

Each processing unit in the data path is storing the necessary information for data processing in a set of registers identified by the encoded port number. Which each clock cycle the new data is processed according to the information stored for the corresponding port number. The information needed to store is the corresponding overhead bytes in the units which do VC mapping plus a counter which identifies the actual position in the corresponding frame. The storage needed for the overhead bytes for VC-11, VC-12 and VC-2 containers is preferably provided on the same chip without an external memory.

In another preferred embodiment of the present invention, the device further comprises at least one buffer for buffering the data received by said at least one port, whereby, preferably, the at least one buffer is formed by a FIFO. Generally, it is sufficient, to provide a buffer having the capacity of storing two bytes, since in a SDH/SONET environment the data are handled byte-wise. However, it might be advantageous to increase the input buffer in order to use it for pointer generation in accordance with a predetermined transmission protocol, such as SONET or SDH.

In order to provide flexible digital cross-connect and add/drop multiplexing functionality between channels the port addressing unit is preferably configured to extract data from said ports in a predetermined order.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context meaning any expression, in any language, code or notation, of a set of instructions intended to cause a system having an information processing capability to perform a particular function either directly or after either or both of the following a) conversion to another language, code or notation; b) reproduction in a different material form.

BRIEF DESCRIPTION OF THE SEVERAL VIEWS OF THE DRAWING(S)

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 3:
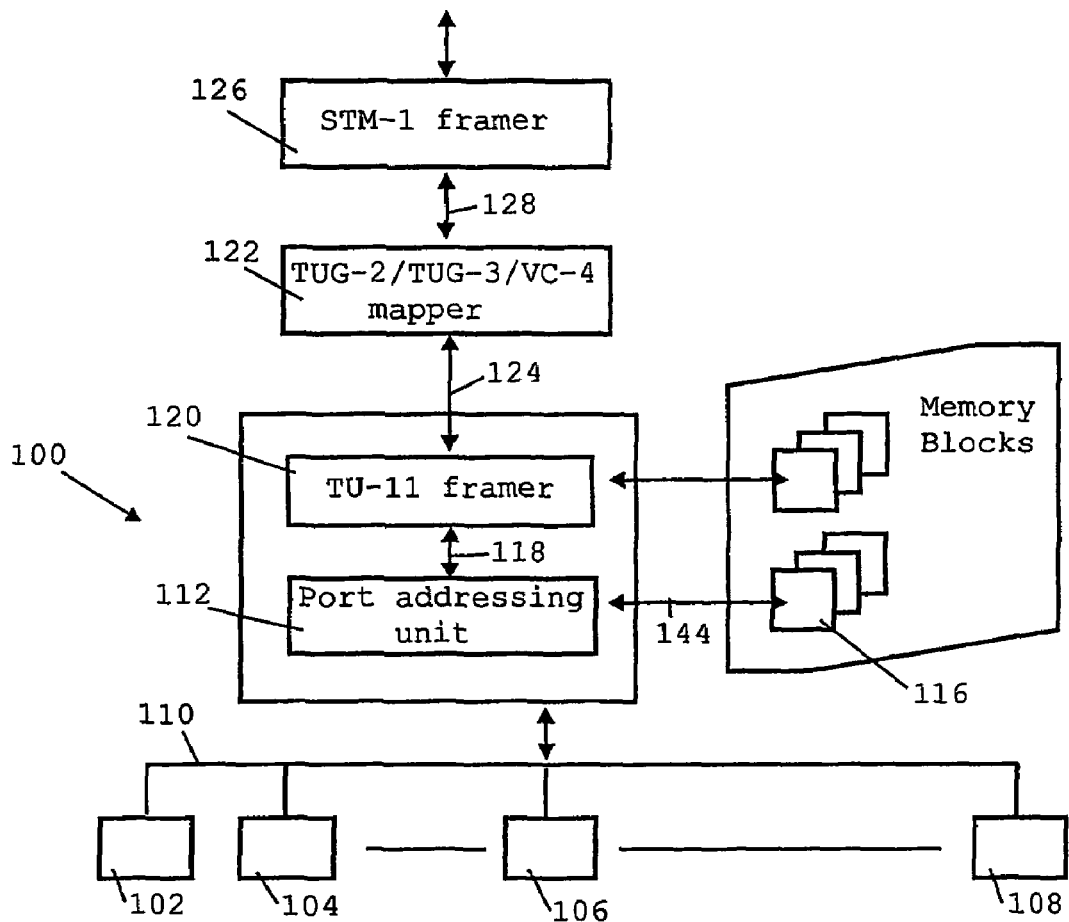
FIG. 3 shows a device for combining multiple data signals having a first data rate into a single data stream having a second data rate being higher than the first data rate for transmission on a shared medium according to the present invention in form of a multiple T1/E1 to single STM-1 mapper

With reference to FIG. 3, there is depicted a device 100 for combining multiple data signals having a first data rate into a single data stream having a second data rate being higher than the first data rate for transmission on a shared medium according to the present invention in form of a multiple T1/E1 to single STM-1 mapper. Each of said multiple data signals enter the device through ports 102 to 108. In case that the device also functions in the demultiplex direction, the ports are also used to write data signal back to the respective lines (not shown). For the sake of clarity not all of the ports needed for an implementation as described below are shown. In fact, any number of ports could be used to implement a device in accordance with the concept of the present invention. In the present case, however, a multiple T1/E1 to STM-1 SDH/SONET mapper is shown which allows mapping of 84 T1 (SONET standard, 1.5 Mb/s) or 63 E1 (SDH standard, 2 Mb/s). The straight lines drawn between ports 104, 106 and 106, 108 symbolize the omitted rectangles for the remaining ports.

A data bus 110 connects the ports 102 to 108 with a port addressing unit 112. On one hand, the port addressing unit 112 communicates over a data link 144 with one or more memory units 116 that are used to temporarily store data received from the ports 102 to 108. On the other hand, the port addressing unit 112 transmits or receives through line 118 data to or from a TU-11 framer 120. Subsequently, from the TU-11 framer 120 the data are forwarded to and returned from TUG-2/TUG-3/VC-4 mapper 122 over line 124, respectively, depending on the mode of operation, multiplex-mode or demultiplex-mode. It is acknowledged that the TUG-2/TUG-3/VC-4 mapper 122 may also be split into a TUG-2 mapper, a TUG-3 mapper and a VC-4 mapper. Likewise, other portions of the described device may be merged into one functional unit. Independently from the functional point of view, the whole device is preferably implemented using one single integrated circuit. The TU-11 framer 120 and the TUG-2/TUG-3/VC-4 mapper 122 function as a data insertion unit in the sense that they apply control data to the data stream to be transmitted.

Figure 1:
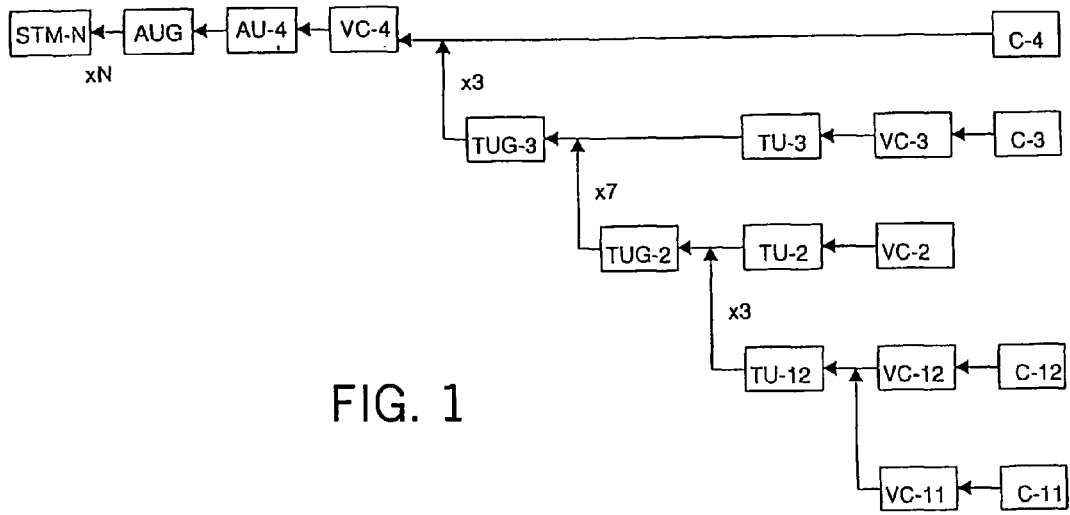
FIG. 1 shows an overview over the SDH signal hierarchy up to the STM-N signal.
Figure 2:
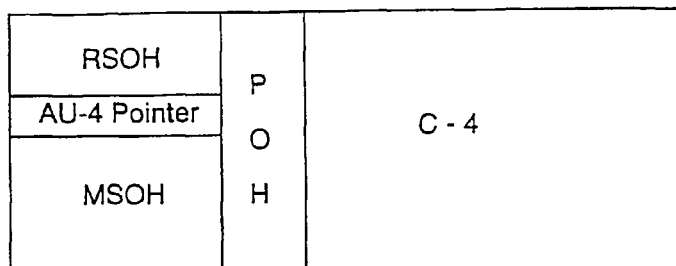
FIG. 2 shows a STM-1 signal with a VC-4 container according to standard provisions.

In the next level the data from the TUG-2/TUG-3/VC-4 mapper 122 are fed into a STM-1 framer 126 through connection 128. From the STM-1 framer 126 the data stream reaches said shared medium (not shown) for transmitting the data received by the ports or vice versa. The shared medium is, e.g., an optical fibre. Thus the device according to FIG. 1 combines 84 T1 (SONET standard, 1.5 Mb/s) or 63 El (SDH standard, 2 Mb/s) channels into a single VC-4 container and finally an STM-1 (OC-3) frame.

The port addressing unit 112 accesses in read or write mode the ports 102 to 108 one by one in order to get and send data, respectively. The order in which the ports are accessed may be random, however, if it is desired to assign the same input ports in a multiplexing mode to identical output ports in demultiplexing mode, the order in which the different channels are multiplexed need to be identical to the order of demultiplexing. In case one channel is meant to be directed from one port onto another port the order of the port access in the multiplexing mode and demultiplexing mode needs to differ respectively.

Together with a STM-1 to STM-64 (OC-3 to OC-192) framer according to the SDH/SONET standard the device according to the present invention can be used to enable STM-64 (OC-192) frame handling with a channelization down to T1 level, including digital cross-connect and add/drop multiplexing functionality between all channels. The mapper is advantageously implemented using a data multiplexing or context switching architecture.

The data path width for the mapper is chosen as 1 byte. The units for VC-11/VC-12 framing and TU-11/TU-12 processing are designed in the data multiplexing or context switching architecture. Hence, these units work on 1 byte from a single T1/E1 channel at one clock cycle and on a corresponding byte from another T1/E1 channel in the next clock cycle. The corresponding parameters per channel are stored in the memory blocks 116. The System clock is running at STM-1 rate for a 1 byte data path width. The TUG-2/TUG-3 mapper unit maps these 84 TU-11 or 63 TU-12 frames into 21 TUG-2 frames and these into 3 TUG-3 frames and these finally into a single data stream which is the payload for the VC-4 container. The VC-4 framer maps this data stream into a single VC-4 container and the STM-1 framer maps this into an AU-4 unit and finally into an STM-1 frame. The reverse direction is done accordingly. However, the design of the VC-4 and STM-1 framer units may also be implemented in other than the data multiplexing or context switching architecture.

Pointer processing is required at two points, at the TU-11/TU-12 level and at the AU-4 level. Pointer generation at the AU-4 level may be skipped since any clock rate adaptation is already solved at the TU-11/TU-12 level and the VC-4/STM-1 units are running with the same clock as the TU-11/TU-12 units. Pointer interpretation, however, is needed on both levels since received STM-1 frames with VC-11/VC-12 units may have been created in a very different way by other mappers.

The mapper should have an STM-1 (OC-3) line interface as well as an interface for VC-4 containers directly. The VC-4 interface allows exchange of VC-4 containers in both directions with the planned STM-1 to STM-64 (OC-3 to OC-192) framer and thereby enables mapping of T1/E1 channels into OC-192 frames and digital cross-connect between all channels down to the T1 level.

In the following the conversion from T1/E1 to STM-1 is described. There are two alternatives to realize the 84 T1 or 63 E1 ports. One way is to include 84 or 63 PLLs (Phase Locked Loop) on the chip. A simple serial data stream is received at each port and clock/data recovery is done at each port or each port receives serial data plus recovered clock from the I/O module. An approach to include 63 PLLs on a chip may is known from the aforementioned document written by M. Stadler et. al., in which a corresponding chip is described handling 63 E1 channels in an architecture with 63 parallel VC-12 and TU-12 processing units plus a special embedded stack microprocessor for handling all overhead byte processing.

Each port needs a small FIFO to buffer at least 2 bytes of incoming data. However, it may be better to enlarge the buffer so that the buffering for pointer generation is done with this buffer too. In this case, all the units above the buffer can run with the STM-1 system clock, any frequency adaptation is done within the buffer unit. The inclusion of VC-1 POH and STM-1 SOH bytes (and fixed stuff bytes) into the data stream can then be achieved by using clock cycles which do not read data bytes from the buffer whenever overhead bytes must be inserted. The overhead bytes are then written into these empty spaces in the data sequence. This is possible since the whole system runs with a single clock and clock rate adaptation is done in the port buffer, i.e., the position of all overhead bytes is known in advance.

In a second step, the port addressing unit reads 1 byte of data from each port-buffer in a predefined sequence. Digital cross-connect functionality on VC-11/VC-12 level is achieved by changing this sequence and hence the position of the VC-11/VC-12 in the final VC-4.

Thirdly, after the port addressing unit a frame-byte alignment unit is provided which ensures that each 8-bit portion on the data path is really 1 byte of the corresponding T1/E1 channel.

In a fourth step, in a VC-11/VC-12 overhead processor unit the required VC-1 path overhead bytes (V5, J2, Z6 and Z7) per port are included into the data stream. The VC-12 consists of the VC-1 POH plus 1023 data bits, six justification control bits, two justification opportunity bits, eight overhead communication channel bits, fixed stuff bits and bits reserved for future overhead communication purposes. The VC-11 consists of the VC-1 POH plus 771 data bits, six justification control bits, two justification opportunity bits, eight overhead communication channel bits, fixed stuff bits and bits reserved for future overhead communication purposes. The T1/E1 data can be mapped into the VC-11/VC-12 in an asynchronous mode, a bit-synchronous mode and a byte-synchronous mode.

In a fifth step, the TU-11/TU-12 unit then is responsible for pointer generation according to the buffer filling at receive line rate in respect to the data extraction from the corresponding port-buffer at System clock rate. The TU-11/TU-12 pointer points to the V5 byte of the VC-1 POH. The V5 byte is the first byte of the multiframe.

Next, the TUG-2/TUG-3/VC-4 mapper then maps the incoming byte data stream into 1 VC-4 container which contains 3 TUG-3 frames which each contains 7 TUG-2 frames which each contains either 4 TU-11 units or 3 TU-12 units. The TUG-3 is a 9-row by 86 column structure. 3 TUG-3s are then mapped into the 9-row by 261 column VC-4 with the following sequence of columns
1. VC-4 POH
2. fixed stuff
3. fixed stuff
4. first column of first TUG-3
5. first column of second TUG-3
6. first column of third TUG-3
7. second column of first TUG-3
8. second column of second TUG-3
...
259. 86th column of first TUG-3
260. 86th column of second TUG-3
261. 86th column of third TUG-3.

Each TUG-3 starts with 2 columns of fixed stuff followed by the byte-interleaved columns of the 7 TUG-2s it contains. Each TUG-2 consists of the columns of 4 byte-interleaved TU-11 or 3 byte-interleaved TU-12 without additional fixed stuff or overhead bytes. In total, each of the 261 columns of the VC-4 corresponds exactly to a corresponding column of a specific TU-11/TU-12 or to fixed stuff or to VC-4 POH. Hence, by reading 1-byte words from the FIFO buffer of each port in the correct sequence and filling in the required overhead and fixed stuff bytes one arrives at the correct VC-4 without the need for any further buffers in the data path. In principle this could be extended even up to the STM-1 frame. However, since it is desired to have the possibility to send VC-4s to the OC-3 to OC-192 framer and not just complete STM-1 frames, the STM-1 framer unit is kept separated from the TUG-2/TUG-3/VC-4 mapper unit with a buffer between both units.

Finally, the STM-1 framer creates the STM-1 frame from the VC-4 by including the corresponding overhead bytes. No pointer generation is needed here since all frequency adaptation was already done at the TU-11/TU-12 level. Accordingly the AU-4 pointer value will be fixed at zero.

In the following the procedure from STM-1/VC-4 to T1/E1 is described. Firstly, the STM-1 framer has to do AU-4 pointer interpretation and section overhead bytes processing.

In a second step, the VC-4/TUG-3/TUG-2 framer either receives the VC-4 from the STM-1 framer or directly through an external interface to the OC-3 to OC-192 framer. The framer processes the VC-4 POH bytes and forwards all TU-11/TU-12 overhead and data bytes towards the TU-11/TU-12 unit. Fixed stuff and VC-4 POH bytes are not forwarded.

Thirdly, the TU-11/TU-12 unit interprets the TU-11/TU-12 pointer values and forwards the data to the VC-11/VC-12 framer unit.

In a fourth step, the VC-11/VC-12 framer unit processes all VC-11/VC-12 overhead bytes and forwards the data without overhead and fixed stuff bytes/bits to the port addressing unit.

Finally, the port addressing unit sends the data to the corresponding output port buffer.

The arrangement of the TU-12s in a VC-4 is described in FIGS. 7-10 of ITU-T standard recommendation G.707. The arrangement of the TU-11s is given in FIGS. 7-11 of the same standard document. There is a clear correlation between time slots of a VC-4 container and the corresponding TU-11s/TU-12s. If K designates the TUG-3 number (1 to 3), L the TUG-2 number (1 to 7) and M the TU-12 number (1 to 3) or TU-11 number (1 to 4) then the columns of the VC-4 (1 to 261) occupied by TU-12 (K,L,M) are given as $$10+(K-1)+3*(L-1)+21*(M-1)+63*(x-1) \text{ for } x=1 \text{ to } 4$$

and the columns occupied by a TU-11 (K,L,M) are given as $$10+(K-1)+3*(L-1)+21*(M-1)+84*(x-1) \text{ for } x=1 \text{ to } 3.$$

1. VC-4 POH
2. fixed stuff—VC-4
3. fixed stuff—VC-4
4. fixed stuff—first TUG-3
5. fixed stuff—second TUG-3
6. fixed stuff—third TUG-3
7. fixed stuff—first TUG-3
8. fixed stuff—second TUG-3
9. fixed stuff—third TUG-3
10. 1. column of 1. TU-11
11. 1. column of 2. TU-11
12. 1. column of 3. TU-11
13. 1. column of 4. TU-11
...
...
93. 1. column of 84. TU-11
94. 2. column of 1. TU-11
...
...
259. 3. column of 82. TU-11
260. 3. column of 83. TU-11
261. 3. column of 84. TU-11

The correlation of the TU-11s with the TUG-3s and TUG-2s is then a bit more complicated but not really relevant. The relation would be:
1. TUG-3-1. TUG-2:1. TU-11, 22. TU-11, 43. TU-11. 64. TU-11
1. TUG-3-2. TUG-2:4. TU-11, 25. TU-11. 46. TU-11, 67. TU-11
1. TUG-3-3. TUG-2:7. TU-11, 28. TU-11. 49. TU-11, 70. TU-11
1. TUG-3-4. TUG-2:10. TU-11, 31. TU-11, 52. TU-11, 73. TU-11
1. TUG-3-5. TUG-2:13. TU-11, 34. TU-11, 55. TU-11, 76. TU-11
1. TUG-3-6. TUG-2:16. TU-11, 37. TU-11, 58. TU-11, 79. TU-11
1. TUG-3-7. TUG-2:19. TU-11, 40. TU-11, 61. TU-11, 82. TU-11
2. TUG-3-1. TUG-2:2. TU-11, 23. TU-11, 44. TU-11, 65. TU-11
2. TUG-3-2. TUG-2:5. TU-11, 26. TU-11, 47. TU-11, 68. TU-11
2. TUG-3-3. TUG-2:8. TU-11, 29. TU-11, 50. TU-11, 71. TU-11
2. TUG-3-4. TUG-2:11. TU-11, 32. TU-11, 53. TU-11, 74. TU-11
2. TUG-3-5. TUG-2:14. TU-11, 35. TU-11, 56. TU-11, 77. TU-11
2. TUG-3-6. TUG-2:17. TU-11, 38. TU-11, 59. TU-11, 80. TU-11
2. TUG-3-7. TUG-2:20. TU-11, 41. TU-11 62. TU-11, 83. TU-11
3. TUG-3-1. TUG-2:3. TU-11, 24. TU-11, 45. TU-11, 66. TU-11
3. TUG-3-2. TUG-2:6. TU-11, 27. TU-11, 48. TU-11, 69. TU-11
3. TUG-3-3. TUG-2:9. TU-11. 30. TU-11. 51. TU-11, 72. TU-11
3. TUG-3-4. TUG-2:12. TU-11, 33. TU-11, 54. TU-11, 75. TU-11
3. TUG-3-5. TUG-2:15. TU-11. 36. TU-11. 57. TU-11, 78. TU-11
3. TUG-3-6. TUG-2:18. TU-11. 39. TU-11 60. TU-11, 81. TU-11
3. TUG-3-7. TUG-2:21. TU-11, 42. TU-11, 63. TU-11, 84. TU-11

A corresponding relation holds in case of 63 TU-12s instead of the 84 TU-11s.

The invention claimed is:

1. A device using a single system clock having system clock cycles for combining at least two data signals having a first data rate into a single data stream having a second data rate higher than the first data rate for transmission on a shared medium, said device comprising:
   a plurality of ports for receiving said at least two data signals,
   a data bus for connecting said plurality of ports to a port addressing unit;
   at least one memory unit for temporarily buffering data received at said plurality of ports;
   a port addressing unit for extracting data from the data signals received by said ports, said port addressing unit accessing said plurality of ports in a predefined sequence to extract data therefrom during successive clock cycles for temporary storage at said at least one memory unit and for placing data extracted from said ports or retrieved from said at least one memory unit at predetermined positions in a single data stream for provision to at least one control data insertion unit; and
   at least one control data insertion unit comprising at least one of a TU-11 or a TU-12 framer for placing control data in said single data stream and a TUG-2/TUG-3/VC-4 mapper for mapping the single data stream into a VC-4 data stream,
   wherein said port addressing unit and at least one control data insertion unit are configured such that the extracting of data, placing of extracted data and placing of control data are performed per cycle and per port based on a common clock within said device.

2. A device according to claim 1, wherein said control data insertion unit is configured to at least partly derive said control data from said data positioned in said data stream.

3. A device according to claim 1, wherein said control data insertion unit is configured to place the extracted data into said single data stream according to a predetermined transmission protocol.

4. A device according to claim 1, wherein said port addressing unit is configured to place the extracted data into said single data stream according to a predetermined transmission protocol.

5. A device according to claim 1, further comprising at least one buffer for buffering the data received by said at least one port.

6. A device according to claim 5, wherein said at least one buffer is formed by a FIFO.

7. A device according to claim 5, wherein said buffer is configured to be used for pointer generation in accordance with a predetermined transmission protocol.

8. A device according to claim 1, wherein the port addressing unit is configured to extract data from said at least one port in a predetermined order.

9. A device according to claim 1, wherein all portions of said device are driven by the same system clock.

10. The device according to claim 1, further comprising an output port for outputting a VC-4 data stream.

11. A device according to claim 1, further comprising an STM-N framing unit for creating a respective data frame.

* * * * *

UNITED STATES PATENT AND TRADEMARK OFFICE
CERTIFICATE OF CORRECTION

PATENT NO. : 7,630,414 B2  Page 1 of 1
APPLICATION NO. : 10/475367
DATED : December 8, 2009
INVENTOR(S) : Rolf Clauberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Second Day of November, 2010

David J. Kappos
*Director of the United States Patent and Trademark Office*